United States Patent
Ray (10) Patent No.: US 8,488,220 B1
(45) Date of Patent: Jul. 16, 2013

(54) METHOD AND APPARATUS FOR CALIBRATING IMAGING EQUIPMENT

(75) Inventor: Damon E. Ray, New Hope, MN (US)

(73) Assignee: Data Recognition Corporation, Maple Grove, MN (US)

( * ) Notice: Subject to any disclaimer, the term of this patent is extended or adjusted under 35 U.S.C. 154(b) by 880 days.

(21) Appl. No.: 12/256,317

(22) Filed: Oct. 22, 2008

Related U.S. Application Data (60) Provisional application No. 60/981,750, filed on Oct. 22, 2007.

(51) Int. Cl.
- H04N 1/46 (2006.01)
- G03F 3/08 (2006.01)
- G06K 9/00 (2006.01)

(52) U.S. Cl.
USPC ........... 358/504; 358/505; 358/518; 382/165; 382/167

(58) Field of Classification Search
USPC ................ 358/1.9, 504, 505, 518, 521, 1.13, 358/1.16, 1.18; 382/167, 162, 165, 164
See application file for complete search history.

(56) References Cited

U.S. PATENT DOCUMENTS

| | | |
|---|---|---|
| 4,813,077 A | 3/1989 | Woods et al. |
| 4,817,179 A | 3/1989 | Buck |
| 4,827,330 A | 5/1989 | Walsh et al. |
| 4,837,842 A | 6/1989 | Holt |
| 4,967,354 A | 10/1990 | Buchanan |
| 4,978,305 A | 12/1990 | Kraft |
| 5,001,769 A | 3/1991 | Reid-Green et al. |
| 5,004,896 A | 4/1991 | Serrell et al. |
| 5,041,874 A | 8/1991 | Nishimori et al. |
| 5,194,966 A | 3/1993 | Quardt et al. |
| 5,313,291 A * | 5/1994 | Appel et al. .................. 358/501 |
| 5,321,611 A | 6/1994 | Clark et al. |
| 5,363,318 A * | 11/1994 | McCauley ...................... 702/85 |
| 5,433,615 A | 7/1995 | Clark |
| 5,452,379 A | 9/1995 | Poor |
| 5,557,515 A | 9/1996 | Abbruzzese et al. |
| 5,672,060 A | 9/1997 | Poor |
| 5,735,694 A | 4/1998 | Clark et al. |
| 5,825,947 A * | 10/1998 | Sasaki et al. .................. 382/321 |

(Continued)

FOREIGN PATENT DOCUMENTS

EP 0 374 892 B1 4/1997

OTHER PUBLICATIONS

""Score Image" Processing of Constructed-Responses, Essays, and Writing Samples", *UNISCORE, Incorporated*, (1992), 3 pgs.

(Continued)

*Primary Examiner* — Madelein A Nguyen
(74) *Attorney, Agent, or Firm* — Schwegman Lundberg & Woessner, P.A.

(57) ABSTRACT

Disclosed herein, among other things, are method and apparatus for calibrating imaging equipment. According to one embodiment of a method, a calibration deck of timing sheets is prepared. The calibration deck includes a sheet with a series of reference marks that help determine the amount of skew, a sheet with objective scoring bubbles that are all filled in with black ink, a grey scale bubble sheet having a predetermined number of shades between black and white, and a sheet with objective scoring bubbles that are all unfilled, or white. The timing sheets are scanned on a scanner, and results from scanning the calibration deck are compared to an industry standard baseline.

21 Claims, 10 Drawing Sheets

U.S. PATENT DOCUMENTS

| | | | |
|---|---|---|---|
| 5,832,100 A * | 11/1998 | Lawton et al. | 382/100 |
| 5,907,742 A * | 5/1999 | Johnson et al. | 399/51 |
| 5,987,149 A | 11/1999 | Poor | |
| 5,987,302 A | 11/1999 | Driscoll et al. | |
| 6,141,120 A * | 10/2000 | Falk | 358/504 |
| 6,173,154 B1 | 1/2001 | Kucinski et al. | |
| 6,183,261 B1 | 2/2001 | Clark et al. | |
| 6,204,873 B1 * | 3/2001 | Shimazaki | 347/172 |
| 6,256,111 B1 * | 7/2001 | Rijavec | 358/1.9 |
| 6,321,052 B1 * | 11/2001 | Yamashina et al. | 399/165 |
| 6,366,759 B1 | 4/2002 | Burstein et al. | |
| 6,404,517 B1 * | 6/2002 | Chao | 358/504 |
| 6,459,509 B1 * | 10/2002 | Maciey et al. | 358/474 |
| 6,471,352 B2 * | 10/2002 | Akahira | 347/106 |
| 6,526,258 B2 | 2/2003 | Bejar et al. | |
| 6,532,026 B2 * | 3/2003 | Takahashi et al. | 347/41 |
| 6,645,029 B2 * | 11/2003 | Akahira | 445/24 |
| 6,714,321 B2 * | 3/2004 | Rao et al. | 358/406 |
| 6,832,825 B1 * | 12/2004 | Nishikori et al. | 347/19 |
| 6,947,571 B1 | 9/2005 | Rhoads et al. | |
| 7,027,187 B1 * | 4/2006 | Zuber | 358/1.9 |
| 7,084,998 B2 | 8/2006 | Blair et al. | |
| 7,162,198 B2 | 1/2007 | Kuntz et al. | |
| 7,295,340 B2 * | 11/2007 | Mestha et al. | 358/1.9 |
| 7,406,392 B2 | 7/2008 | Gedlinske et al. | |
| 7,411,688 B1 * | 8/2008 | Zhai et al. | 356/601 |
| 7,474,783 B2 * | 1/2009 | Sharma et al. | 382/165 |
| 7,505,173 B2 * | 3/2009 | Viturro et al. | 358/1.9 |
| 7,516,895 B2 | 4/2009 | Holoubek | |
| 7,573,616 B2 | 8/2009 | Poor | |
| 7,630,931 B1 * | 12/2009 | Rachev et al. | 705/36 R |
| 7,692,832 B2 * | 4/2010 | Klassen | 358/518 |
| 7,697,166 B2 * | 4/2010 | Bray | 358/1.9 |
| 7,742,991 B2 | 6/2010 | Salzmann et al. | |
| 7,831,195 B2 | 11/2010 | Borchers | |
| 7,835,043 B2 * | 11/2010 | Gila et al. | 358/504 |
| 7,992,953 B2 * | 8/2011 | Yorimoto et al. | 347/14 |
| 8,102,412 B2 * | 1/2012 | Klemer et al. | 347/248 |
| 2001/0028916 A1 * | 10/2001 | Akahira | 427/8 |
| 2001/0040979 A1 * | 11/2001 | Davidson et al. | 382/100 |
| 2002/0054384 A1 * | 5/2002 | Motamed | 358/504 |
| 2002/0126172 A1 * | 9/2002 | Akiyama | 347/19 |
| 2002/0161772 A1 | 10/2002 | Bergelson et al. | |
| 2003/0016263 A1 * | 1/2003 | Takahashi et al. | 347/19 |
| 2003/0105721 A1 | 6/2003 | Ginter et al. | |
| 2003/0118976 A1 | 6/2003 | Makishima et al. | |
| 2003/0126001 A1 | 7/2003 | Northcutt et al. | |
| 2003/0202029 A1 * | 10/2003 | Bronswijk et al. | 347/19 |
| 2004/0114164 A1 * | 6/2004 | Linder et al. | 358/1.9 |
| 2004/0117617 A1 | 6/2004 | Geller et al. | |
| 2004/0130739 A1 * | 7/2004 | Adam et al. | 358/1.9 |
| 2004/0131279 A1 | 7/2004 | Poor | |
| 2004/0264771 A1 * | 12/2004 | Sharma et al. | 382/165 |
| 2005/0024410 A1 * | 2/2005 | Subirada et al. | 347/16 |
| 2005/0094170 A1 * | 5/2005 | Ichitani | 358/1.9 |
| 2005/0172226 A1 | 8/2005 | Kobashi et al. | |
| 2005/0206982 A1 * | 9/2005 | Hattori | 358/532 |
| 2005/0213790 A1 | 9/2005 | Rhoads et al. | |
| 2006/0028699 A1 * | 2/2006 | Venable et al. | 358/504 |
| 2006/0077407 A1 * | 4/2006 | Tanaka | 358/1.9 |
| 2006/0164700 A1 * | 7/2006 | Hayashi | 358/518 |
| 2006/0193017 A1 * | 8/2006 | Zuber | 358/504 |
| 2006/0195508 A1 | 8/2006 | Bernardin et al. | |
| 2006/0227386 A1 * | 10/2006 | Nuuja et al. | 358/406 |
| 2006/0285134 A1 * | 12/2006 | Viturro et al. | 358/1.9 |
| 2006/0288279 A1 | 12/2006 | Yacoub et al. | |
| 2007/0024657 A1 * | 2/2007 | Zhang et al. | 347/19 |
| 2007/0024928 A1 * | 2/2007 | Ono | 358/504 |
| 2007/0201112 A1 * | 8/2007 | Motamed | 358/504 |
| 2007/0247681 A1 * | 10/2007 | Klassen | 358/532 |
| 2008/0080027 A1 * | 4/2008 | Mestha et al. | 358/504 |
| 2008/0152371 A1 * | 6/2008 | Burry et al. | 399/50 |
| 2008/0225067 A1 * | 9/2008 | Morino et al. | 347/14 |
| 2008/0316552 A1 * | 12/2008 | Poor | 358/509 |
| 2009/0002724 A1 * | 1/2009 | Paul et al. | 358/1.1 |
| 2009/0059321 A1 * | 3/2009 | Buckley | 358/504 |
| 2009/0086230 A1 * | 4/2009 | Reed | 358/1.9 |
| 2010/0231728 A1 * | 9/2010 | Holub | 348/207.2 |
| 2010/0284041 A1 * | 11/2010 | Warnes | 358/406 |

OTHER PUBLICATIONS

"Image Processing of Open-Ended Questions", *UNISCORE, Incorporated*, (1992), 4 pgs.

Cason, Gerald J, et al., "Integrated Test Scoring, Performance Rating and Assessment Records Keeping", *Innovations in Medical Education, Association of American Medical Colleges*, Washington, D.C., Paper presented at the annual meeting of the Association of Medical Colleges., (Nov. 1, 1987), 2-20.

Gathy, P, et al., "Computer-Assisted Self-Assessment (CASA) in Histology", *Computers Education.*, vol. 17, No. 2., (1991), 109-116.

Reid-Green, Keith S, "A High Speed Image Processing System [Journal Paper]", *IMC Journal*, vol. 26, No. 2, Mar.-Apr., USA, (1990), 12-14.

Zuckerman, Ronald A, "Optical Scanning for Data Collection, Conversion & Reduction", *NITS, U.S. Department of Commerce, National Technical Information Service*, August, Springfield, VA, USA, (1967), 49 pgs.

U.S. Appl. No. 12/256,282, Non Final Office Action mailed Jan. 4, 2012, 12 pgs.

U.S. Appl. No. 12/256,303, Non Final Office Action Mailed Jan. 5, 2012, 9 pgs.

U.S. Appl. No. 12/256,303, Response filed Oct. 24, 2011 to Restriction Requirement mailed Jul. 23, 2011, 6 pgs.

U.S. Appl. No. 12/256,303, Restriction Requirement mailed Aug. 23, 2011, 5 pgs.

U.S. Appl. No. 12/256,339, Non Final Office Action mailed Jan. 10, 2012, 13pgs.

U.S. Appl. No. 12/256,354, Restriction Requirement mailed Nov. 21, 2011, 8 pgs.

"U.S. Appl. No. 12/256,282, Response filed Apr. 4, 2012 to Non Final Office Action mailed Jan. 4, 2012", 7 pgs.

"U.S. Appl. No. 12/256,303, Final Office Action mailed May 29, 2012", 15 pgs.

"U.S. Appl. No. 12/256,303, Response filed Apr. 5, 2012 to Non Final Office Action mailed Jan. 5, 2012", 8 pgs.

"U.S. Appl. No. 12/256,339, Response filed Apr. 10, 2012 to Non Final Office Action mailed Jan. 10, 2012", 7 pgs.

"U.S. Appl. No. 12/256,354, Non Final Office Action maied Mar. 1, 2012", 8 pgs.

"U.S. Appl. No. 12/256,282, Advisory Action mailed Dec. 31, 2012", 3 pgs.

"U.S. Appl. No. 12/256,282, Response filed Dec. 6, 2012 to Final Office Action mailed Aug. 6, 2012", 7 pgs.

"U.S. Appl. No. 12/256,339, Examiner Interview Summary mailed Nov. 23, 2012", 3 pgs.

"U.S. Appl. No. 12/256,339, Non Final Office Action mailed Jan. 9, 2013", 16 pgs.

"U.S. Appl. No. 12/256,339, Response filed Nov. 15, 2012 to Final Office Action mailed Sep. 7, 2012", 9 pgs.

"U.S. Appl. No. 12/256,354, Corrected Notice of Allowance mailed Jan. 17, 2013", 2 pgs.

"U.S. Appl. No. 12/256,354, Notice of Allowance mailed Feb. 1, 2013", 6 pgs.

"U.S. Appl. No. 12/256,354, Response filed Dec. 21, 2011 to Restriction Requirement mailed Nov. 21, 2011", 5 pgs.

* cited by examiner

METHOD AND APPARATUS FOR CALIBRATING IMAGING EQUIPMENT

CROSS-REFERENCE TO RELATED APPLICATIONS

This application claims the benefit of provisional U.S. patent application Ser. No. 60/981,750, filed on Oct. 22, 2007, which is hereby incorporated by reference in its entirety.

TECHNICAL FIELD

This disclosure relates generally to imaging equipment such as scanners, and more particularly to method and apparatus for calibrating imaging equipment.

BACKGROUND

Imaging equipment, or scanning devices such as scanners, are used to collect data from documents and translate the collected data for digital storage and processing. During the course of scanning large volumes of documents, scanners may experience inaccuracies in data collection due to camera profiling, camera adjustments or bulb replacement In order to promote precision and accuracy of a batch-document scanning process, it is desirable to ensure that quality standards for the scanners are continually met. Improved method and apparatus for calibrating imaging equipment are needed.

SUMMARY

The above-mentioned problems and others not expressly discussed herein are addressed by the present subject matter and will be understood by reading and studying this specification.

Disclosed herein, among other things, are method and apparatus for calibrating imaging equipment. According to one embodiment of a method, a calibration deck of timing sheets is prepared. The calibration deck includes a sheet with a series of reference marks that help determine the amount of skew, a sheet with objective scoring bubbles that are all filled in with black ink, a grey scale bubble sheet having a predetermined number of shades between black and white, and a sheet with objective scoring bubbles that are all unfilled, or white. The timing sheets are scanned on a scanner, and results from scanning the calibration deck are compared to an industry standard baseline.

One aspect of the disclosure includes a system for calibrating a scanner. According to an embodiment, the system includes a calibration deck of sheets. The calibration deck includes, a sheet with a series of reference marks, a sheet with objective scoring bubbles that are all filled in with black ink, a grey scale bubble sheet having a predetermined number of shades between black and white, and a sheet with objective scoring bubbles that are all unfilled, or white. According to various embodiments, the calibration deck is adapted to be scanned on the scanner, and where results from scanning the calibration deck are compared to an industry standard baseline. The system includes a display for depicting results for at least one scanner, in an embodiment.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter generally relates to method and apparatus for calibrating imaging equipment. A computer application for calibrating imaging equipment is referred to as a calibration facilitator. To ensure quality standards are continually met on scanners, the calibration facilitator application is used to compare baseline calibration decks against scanner output. In an embodiment, IBML scanners are calibrated. However, other types of scanners can be calibrated without departing from the scope of this disclosure.

The present subject matter is part of a system whose purpose is to convert education assessments (standardized tests, etc.) from paper format to electronic format, thereby providing a means to score both objective (bubbled) fields and writing responses. In addition to scoring fields, the system associates students to their scanned data and achieves a high level of quality in scanned results. Documents are received and scanned, images are generated and passed through processes and applications before data is handed off to peripheral systems.

The capture of images on a scanner involves several factors. The setup of the camera, the brightness of the light source, and the speed and consistency of the paper as it travels down the track are all factors that can affect the quality and darkness of the captured images. As each bubble response must be read on a grayscale range (16 levels from 0 to F), the darkness in which an image is captured must be precise and consistent across all scanners in the system. Most scanners do not have any built-in features to ensure that the scanners are capturing images to a set standard. Therefore, a scanner with a calibration mechanism, which is calibrated to an industry standard, is used to ensure accuracy of all scanners in the system. By scanning a set of documents on a scanner calibrated to the industry standard, and then obtaining data about that scan, the data can be used as a calibrated "baseline." When the same set of documents is scanned on other "uncalibrated" scanners (such as an IBML scanner, in an embodiment), the results are compared to the calibrated baseline to create a profile that defines how the image would need to change to match the baseline. Once a scanner has gone through the calibration process, every subsequent image captured on the scanner can be adjusted based on the created calibrated profile. This process is repeatable, and is done periodically to ensure that other factors have not changed how an image is being captured relative to the baseline.

The calibration facilitator application is a user-based application which serves multiple roles for the calibration environment. It can be used to scan and process calibration decks, review the results of previous calibration scans, import baseline files generated when a calibration deck is scanned on an industry standard calibrated scanner (such as on NCS 5000 scanner, in an embodiment), and perform maintenance of a calibration deck. A calibration deck is a set of printed documents designed for capturing. In an embodiment, one part of the deck includes 16 documents, each having 256 bubbles placed in various patterns. Bubbles refer to any two-dimensionally closed form adapted to be filled in with a writing utensil, such as but not limited to: a circle, an ellipse, a square, and a rectangle. Bubbles with other shapes and sizes can be used without departing from the scope of this disclosure. Each of the bubbles on the 16 documents is defined to a certain grayscale level, from white to black. In this embodiment, two additional documents in the deck have all 256 white bubbles (used to ensure paper darkness is capturing consistently across the image), and two other documents have 256 black bubbles (used to ensure black captures consistently). This embodiment further includes 30 documents that are identical and have a series of reference marks (or "T" marks, in an embodiment) printed at precise distances (both vertically and horizontally) across the form. According to various embodiments, reference marks may be in any convenient shape for capturing by the scanner, including letters or other figures. The reference marks are used to make sure the image is capturing at the right speed on the scanner A threshold is used to compare the scanner to the calibrated industry scanner, and if the scanner is outside tolerances, a maintenance person must service the scanner before continuing. For example, if 3 or 4 marks are blacker than "0" on a hexadecimal scale, then the scanner fails the calibration. The depicted embodiments do not calibrate the scanners; rather check the scanners to ensure they remain in calibration. Using multiple (16 in an embodiment) different sheets with grayscale colors provides better resolution to ensure proper calibration of scanners, and allows results to be depicted more accurately.

Figure 1:
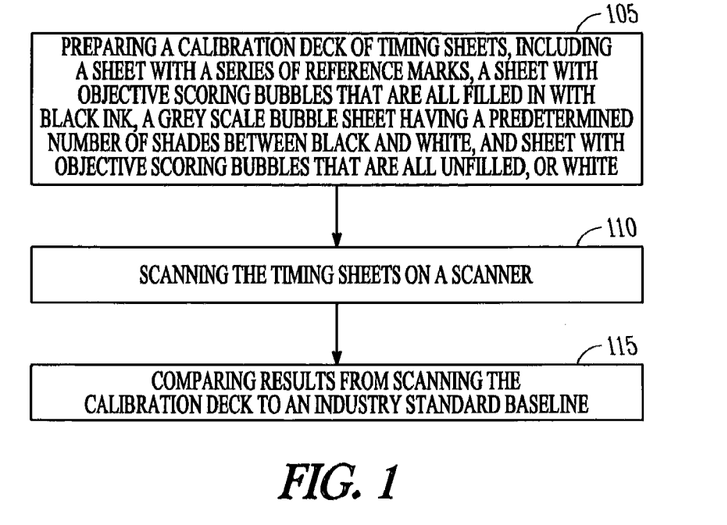
FIG. 1 illustrates a flow diagram of an embodiment of a method for calibrating imaging equipment.

FIG. 1 illustrates a flow diagram of an embodiment of a method for calibrating imaging equipment. According to one embodiments of a method, a calibration deck of timing sheets is prepared, at 105. The calibration deck includes a sheet with a series of reference marks that help determine the amount of skew, a sheet with objective scoring bubbles that are all filled in with black ink, a grey scale bubble sheet having a predetermined number of shades between black and white, and a sheet with objective scoring bubbles that are all unfilled, or white. The timing sheets are scanned on a scanner, at 110, and results from scanning the calibration deck are compared to an industry standard baseline, at 115.

According to various embodiments of the method, comparing results includes determining the amount of skew of an image on a sheet, determining the amount of stretch of an image on a sheet, measuring track speed of the scanner, and/or determining the proportionality of an image on a sheet. The method further includes automatically interpreting results using a threshold, in an embodiment. Interpreting the results includes proceeding if the score is acceptable within a predefined tolerance, and also includes providing a notification of an unacceptable result so that the scanner can be manually recalibrated, in various embodiments. In various method embodiments, a status bar is provided showing the relative completion of calibration deck processing. In an embodiment, the relative completion is measured in percent. The method also includes determining the amount of one or more of shrinkage, stretch, skew or other distortions of a scanned page, in various embodiments.

Comparing results of the calibration deck scan to an industry standard baseline includes comparing the results to a scanner with a self-calibration feature, such as an NCS scanner, in an embodiment. The comparison establishes a darkness level, in various embodiments. According to various embodiments, each calibration deck can only be used a predetermined number of times. For example, each calibration deck can be scanned 10 times before it is replaced. An authorized user can adjust the number of uses per calibration deck, in an embodiment. For example, in FIG. 6, the display provides for an entry of maximum number of scans 606. Each scanner, or machine, is recalibrated on a predetermined schedule. In one embodiment, each scanner is recalibrated every 12 hours. The schedule for calibration of scanners can be adjusted by an authorized user, in various embodiments.

One aspect of the disclosure includes a system for calibrating a scanner. According to an embodiment, the system includes a calibration deck of sheets. The calibration deck includes, a sheet with a series of reference marks, a sheet with objective scoring bubbles that are all filled in with black ink, a grey scale bubble sheet having a predetermined number of shades between black and white, and a sheet with objective scoring bubbles that are all unfilled, or white. According to various embodiments, the calibration deck is adapted to be scanned on the scanner, and results from scanning the calibration deck are compared to an industry standard baseline. The system includes a display for depicting results for at least one scanner, in an embodiment.

The display includes a status bar showing the relative completion of calibration deck processing, in an embodiment. The relative completion can be measured in percent. In various embodiments, the display includes a notification of an unacceptable result so that the scanner can be manually recalibrated. In one embodiment, at least sixteen grey scale bubble sheets are included having a predetermined number of shades between black and white. The grey scale bubble sheet has 256 shades, in an embodiment. At least 30 sheets with reference marks (such as a series of "T"'s, in an embodiment), at least two sheets with objective scoring bubbles that are all filled in with black ink, and at least two sheets with objective scoring bubbles that are all unfilled, or white are included in various embodiments.

Figure 2:
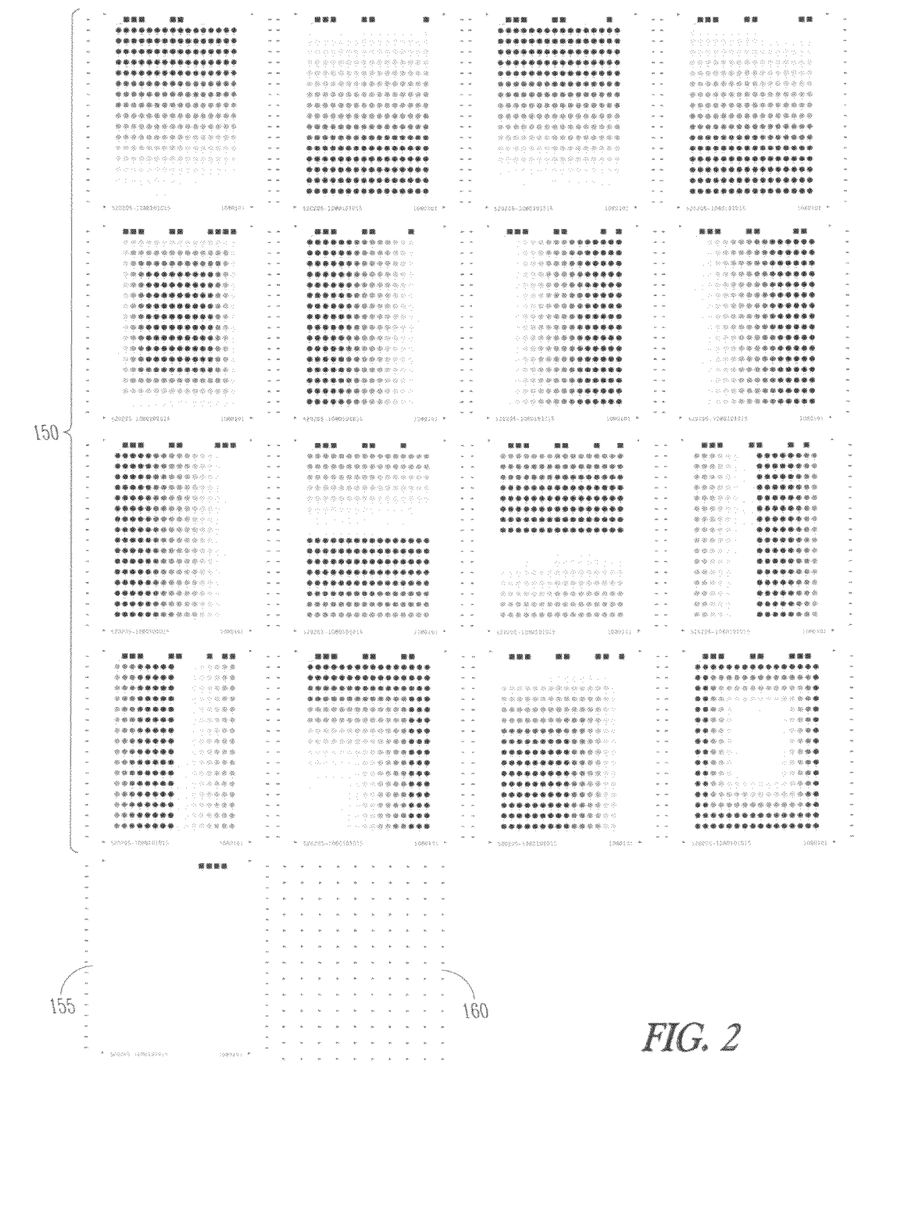
FIG. 2 illustrates sample sheets from a calibration deck, according to an embodiment.

FIG. 2 illustrates sample sheets from a calibration deck, according to an embodiment. The first sixteen pages 150 of a calibration deck include sixteen image sheets, each containing targets of 256 levels of darkness in various placements on each sheet. The present embodiments include additional pages, including pages 160 with a reference marks (here a series of "T"'s) that help determine stretch and skew, and pages including bubbles for answering objective examination questions. In one embodiment, at least one page 155 is included in the deck in with all bubbles unmarked, or white. At least one page (not shown) is included in the deck with all bubble at the darkest level, or black, in one embodiment. This checks for color consistency across the paper, and can measure down to the pixel level. The same paper stock is used for production and calibration, in various embodiments.

The calibration facilitator is an automated application and provides a status screen for a user. The status screen includes a scan batch, validate batch and batch status bar showing percent completion, in various embodiments. The results of the calibration deck scan are processed automatically using a threshold to determine whether a successful scan has been completed. If a successful (errors below the threshold) scan is completed on a scanner, processing continues without interruption on that scanner. If the scan is unsuccessful (errors above the threshold) for a scanner, a notification is made to provide instruction to a user that manual calibration of the identified scanner is required.

Scanned images include an equal number of image sheets from the scanner's top camera and from the scanner's bottom camera, in an embodiment. In addition to the images, a hexadecimal score (0-9, A-F) is captured for each target. The application provides the user with a programmatic comparison of the scanned image and the baseline calibration image, the output of which is displayed on a screen.

A reference mark locator application and a reference mark viewer application work together with the calibration facilitator. These applications help identify image capture problems. They work together to capture a series of measurements on scanned images and display the measurements and any patterns found to the user of the applications.

The reference mark locator application uses specially printed documents having known printing specifications. These documents have 140 reference marks (or T-marks, in an embodiment) printed in 14 rows and 10 columns. Each reference mark is printed at a precise distance from the other (0.75 inches, for example), both vertically and horizontally. After an image is captured of one of these documents on the scanner, it is fed into the locator application and all of the T-marks are programmatically located. The straight-line distance between each mark and its neighboring marks is calculated and output both as an annotation on the image, as well as into a text file. Using 0.75 inches as an example, all distances would be exactly 150 pixels on a perfect image (assuming 200 dots per inch (dpi)). In one embodiment, this application is used with a batch of 50 documents, scanned twice so images off both the top and bottom camera of IBML scanners are captured.

The reference mark viewer application is used to view the results of the batch of documents scanned using the reference mark locator. Once a batch is selected, the user can look at the measurement patterns on all of the images of the batch in rapid succession. The user can set color thresholds to make the viewing easier. For example, a user can set the application to identify all measurements of 149 pixels or less as green, all measurements of 151 pixels or more as red, and all measurements of exactly 150 pixels as white. Examining the results will show a pattern on multiple images where the measurements are consistently too big or too small, and the at-fault scanner can be identified and re-calibrated. It may be that the belt speeds are too fast, too slow, out of synch, or that the transition points between rollers on the scanner are flawed. The results may show something wrong from top to bottom or left to right over the entire image, or that specific rows or columns of measurements are consistently off in the image. The tolerance for errors depends upon the application the scanner is used for. For example, for certain scanner applications involving objective test answer sheets, measurements between 148 and 152 pixels are acceptable.

Figure 3A:
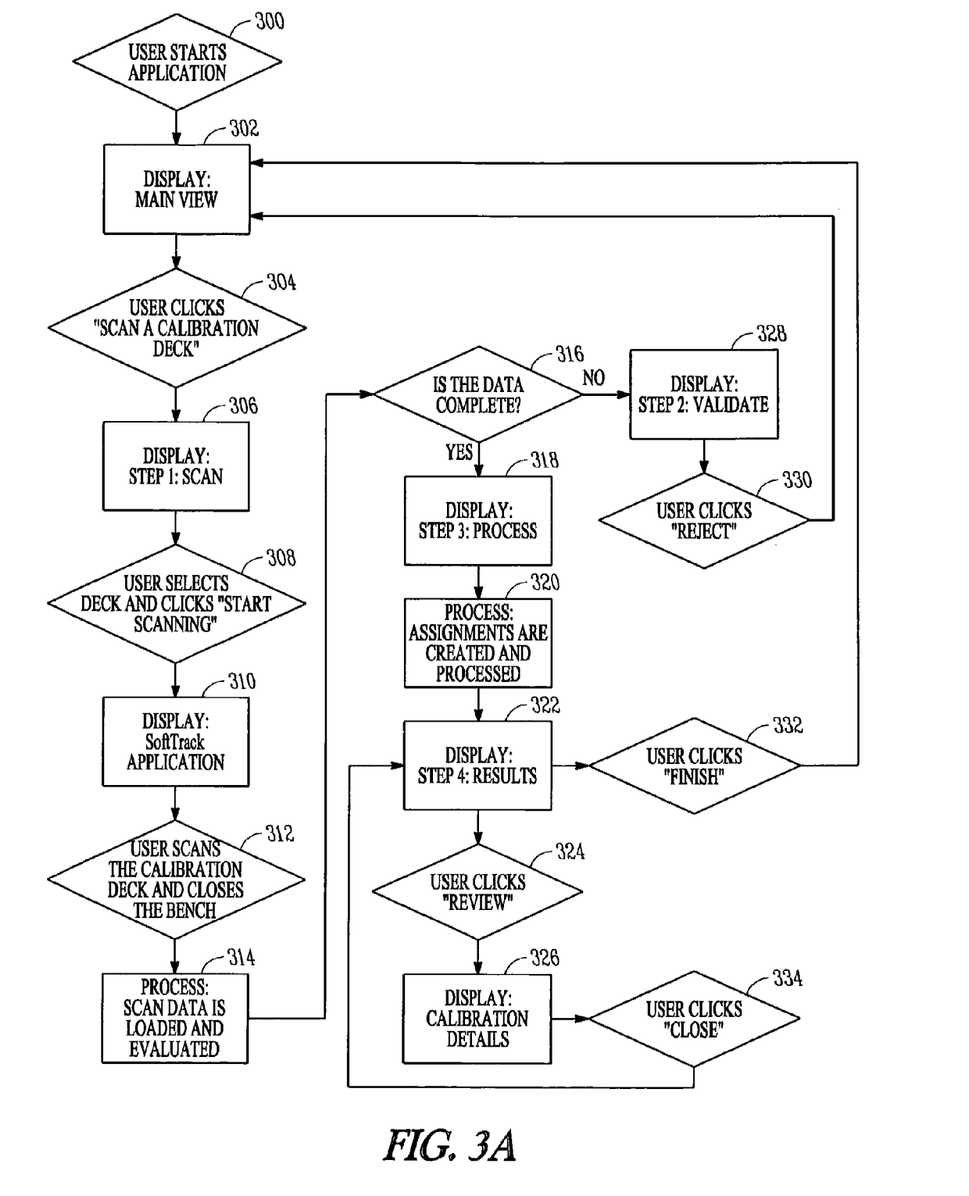
FIG. 3A illustrates a flow diagram of a scan process, according to an embodiment.

FIG. 3A illustrates a flow diagram of a scan process, according to an embodiment. A user starts the application at 300, and at 302 the display provides a main view. At 304, the user clicks "scan a calibration deck", and the scan is displayed at 306. At 308, the user selects a deck for scanning and clicks "start scanning", and the tracking application displays at 310. At 312, the user scans the calibration deck and closes the batch, and scan data is loaded and evaluated at 314. At step 316, an evaluation is made to determine if the data is complete. If not, at 328 the validate screen is displayed and at 330 the user clicks reject which returns to step 302. If the data is compete, the process screen is displayed at 318, assignments are created and processed at 320, and results are displayed at 322. User can then click "finish" at 332 to return to the main display 302, or user can click "review" at 334 to display the calibration results at 326, and then click "close" at 334 to return to step 322.

Figure 3B:
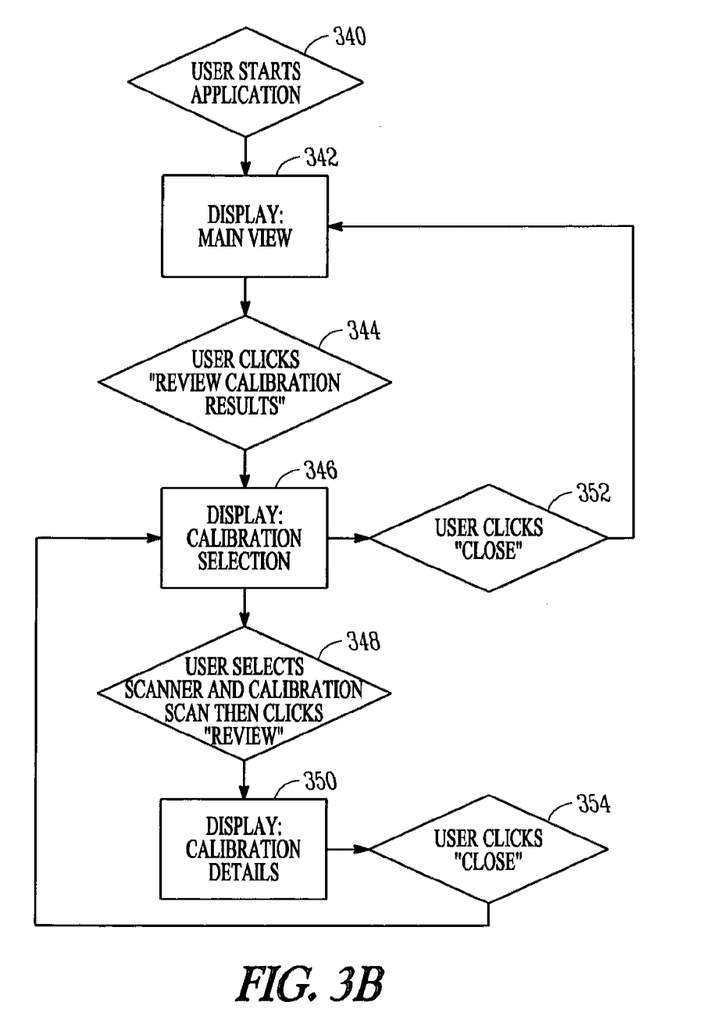
FIG. 3B illustrates a flow diagram of a calibration review process, according to an embodiment.

FIG. 3B illustrates a flow diagram of a calibration review process, according to an embodiment. At step 340, the user starts the application and the main view is displayed at 342. At 344, the user clicks "review calibration results" and calibration selection is displayed at 346. If the user clicks "close" at 352, the main view is displayed. If the user selects scanner and calibration scan and clicks "review" at 348, calibration details are displayed at 350. The user clicks "close" at 354 to return to the calibration selection display 346.

Figure 3C:
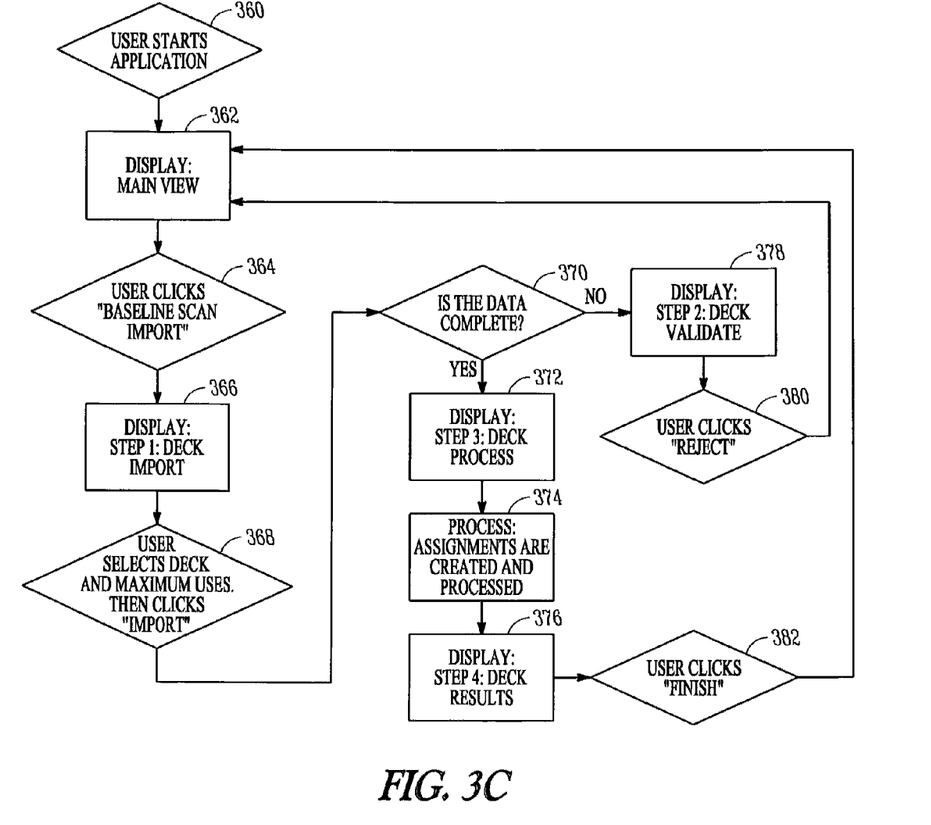
FIG. 3C illustrates a flow diagram of a baseline scan import process, according to an embodiment.

FIG. 3C illustrates a flow diagram of a baseline scan import process, according to an embodiment. At step 360, the user starts the application and the main view is displayed at 362. At 364, the user clicks "baseline scan import" and deck import displays at 366. At 368, the user selects deck and maximum uses, and then clicks "import." If the data is not complete at 370, the deck validate screen is displayed at 378 and the user clicks "reject" at 380 to return to the main view display at 362. If the data is complete at 370, the deck process screen displays at 372, assignments are created and processed at 374, and deck results are displayed at 376. The user clicks "finish" at 382 to return to the main view display at 362.

Figure 3D:
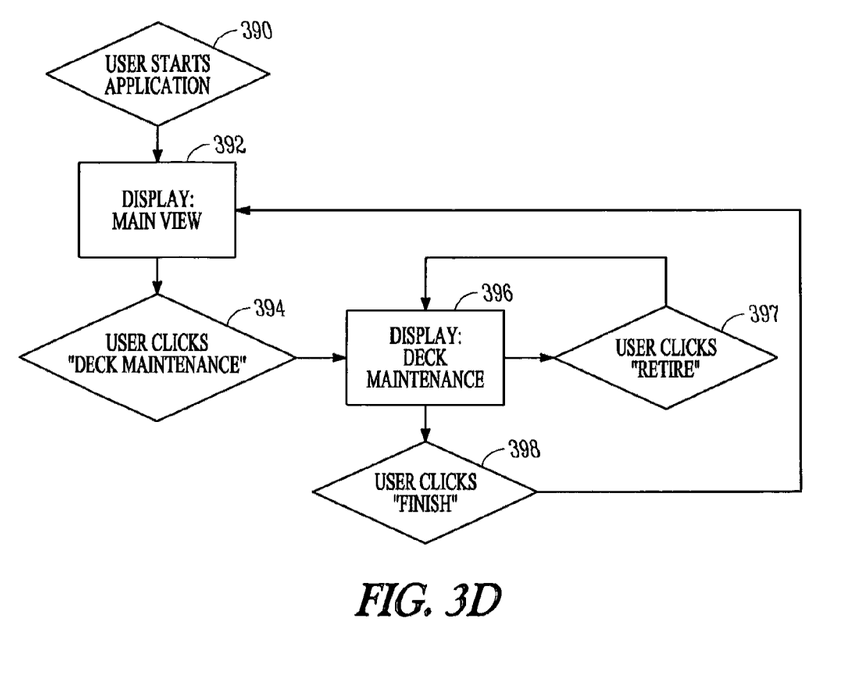
FIG. 3D illustrates a flow diagram of a deck maintenance process, according to an embodiment.

FIG. 3D illustrates a flow diagram of a deck maintenance process, according to an embodiment. At step 390, the user starts the application and the main view is displayed at 392. At 394, the user clicks "deck maintenance" and deck maintenance is displayed at 396. If the user clicks "retire" at 397, the display remains, but if the user clicks "finish" at 398, the display returns to the main view at 392.

Figure 5:
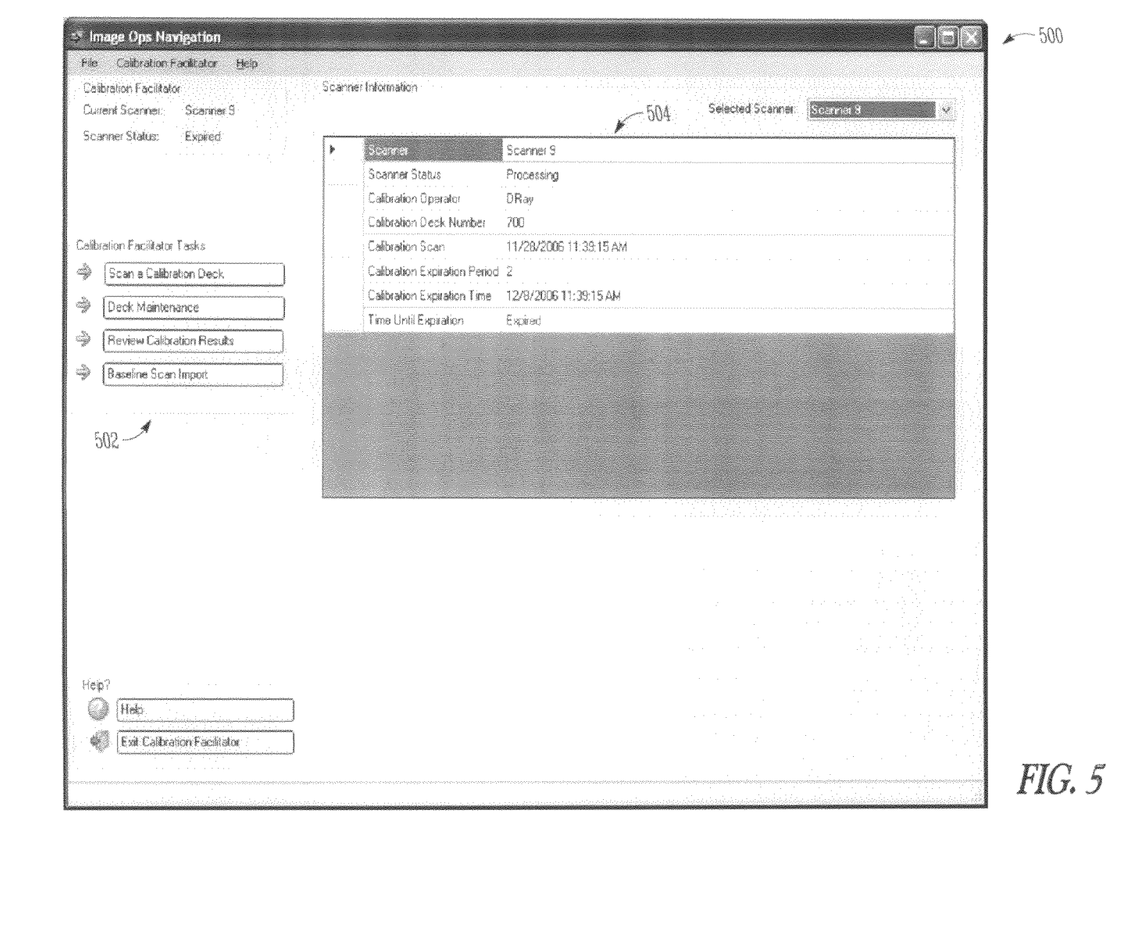
FIGS. 5-7 illustrate a screen images presented to a user of a calibration facilitator system, according to various embodiments.
Figure 6:
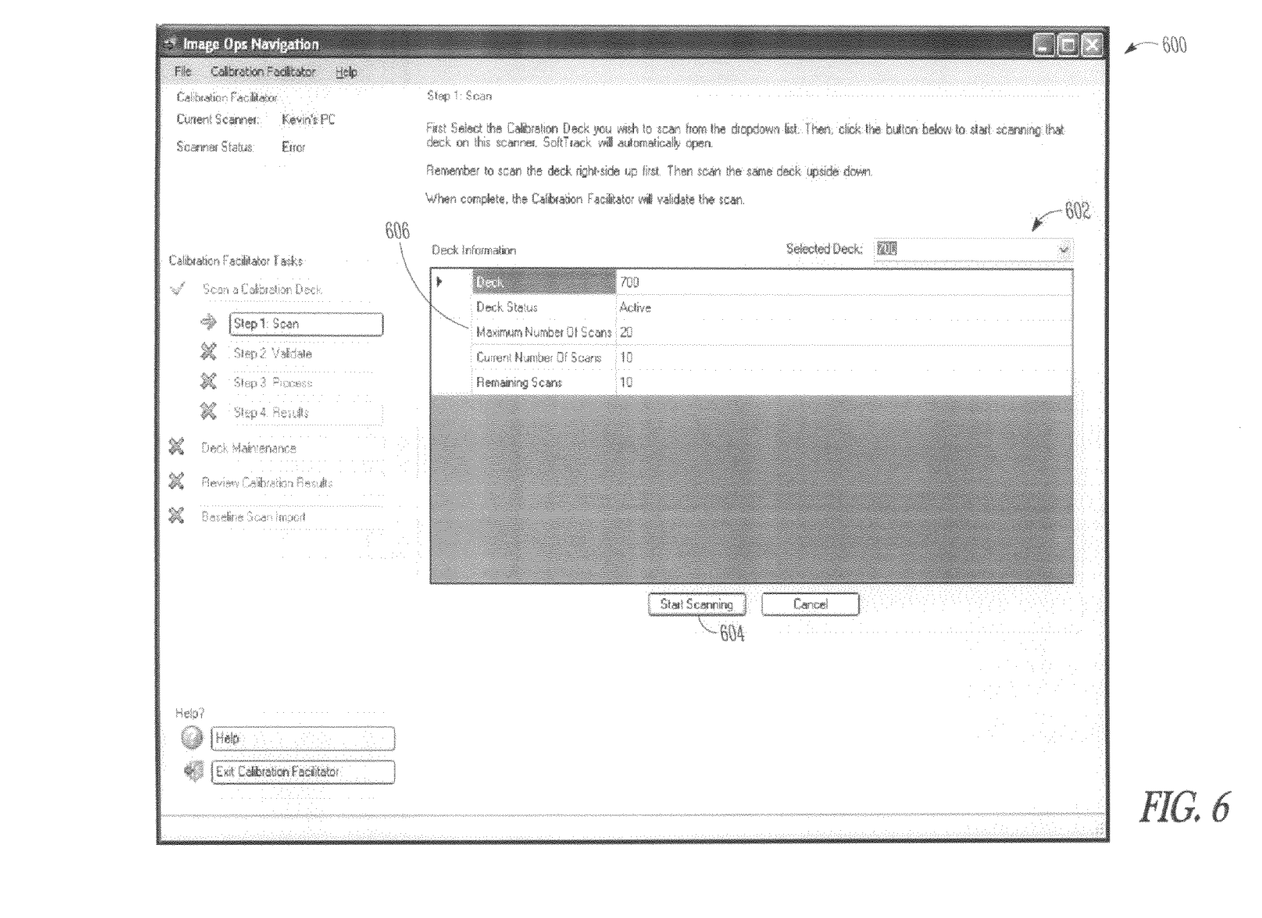
Figure 7:
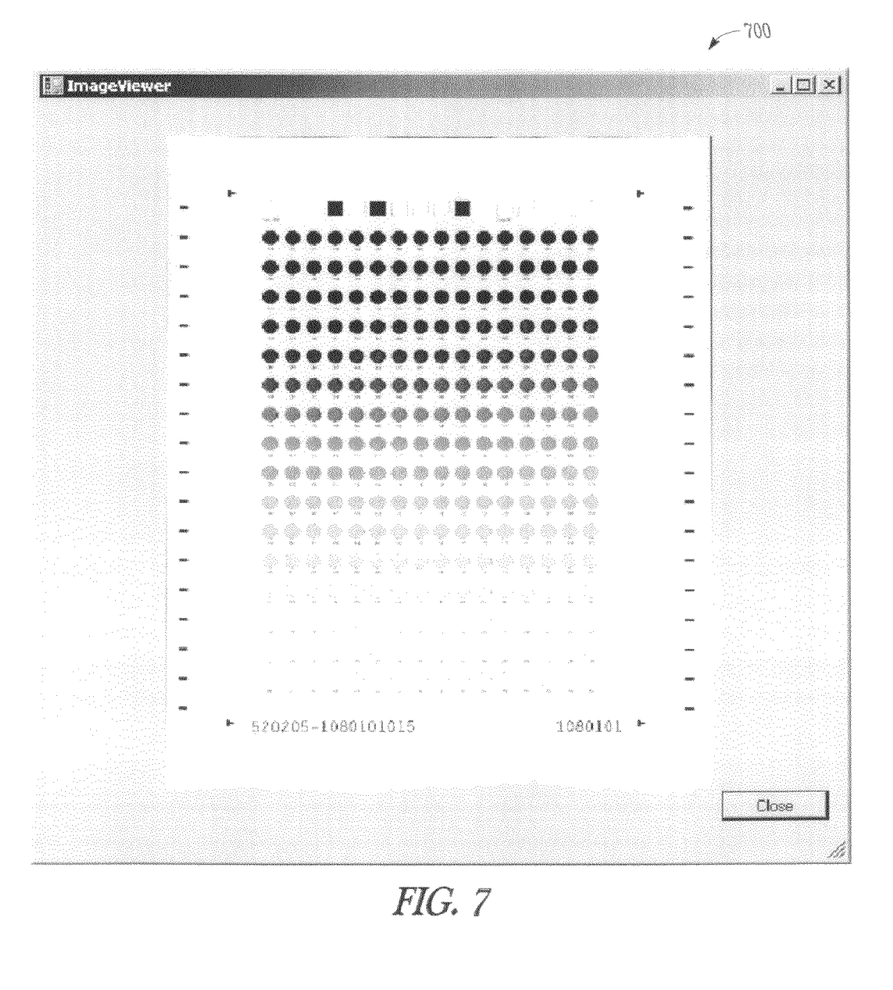

FIGS. 5-7 illustrate a screen images presented to a user of a calibration facilitator system, according to various embodiments. FIG. 5 illustrates the default view 500 of the application, which is visible upon entering the calibration facilitator application. The user can select from option buttons 502 at the left of the screen and can view information about the current scanner or other scanners in the system in the details area 504 at the right of the screen. FIG. 6 illustrates a screen 600 obtained when the user chooses to scan a new calibration deck from the view in FIG. 5. The user can select a valid calibration deck from the dropdown menu 602. If the selected deck is at a status that allows it to be scanned, then the user can click the "start scanning" button 604. In various embodiments, the display provides for an entry of maximum number of scans 606. In an embodiment, that will transfer control from the calibration facilitator to the scanner tracking software. A new batch will be created and opened within the tracking software and will be defined under the calibration job. Once scanning is complete and the user closes the scanned batch of documents, control returns to the calibration facilitator application. FIG. 7 illustrates a detail image viewer screen 700. Anytime a user double clicks on a row of data with an image path or on a thumbnail image, this form will appear. It will display the image in the standard image viewer control, so all zooming and rotating function are available. Additional screen views are available without departing from the scope of this disclosure.

Figure 4:
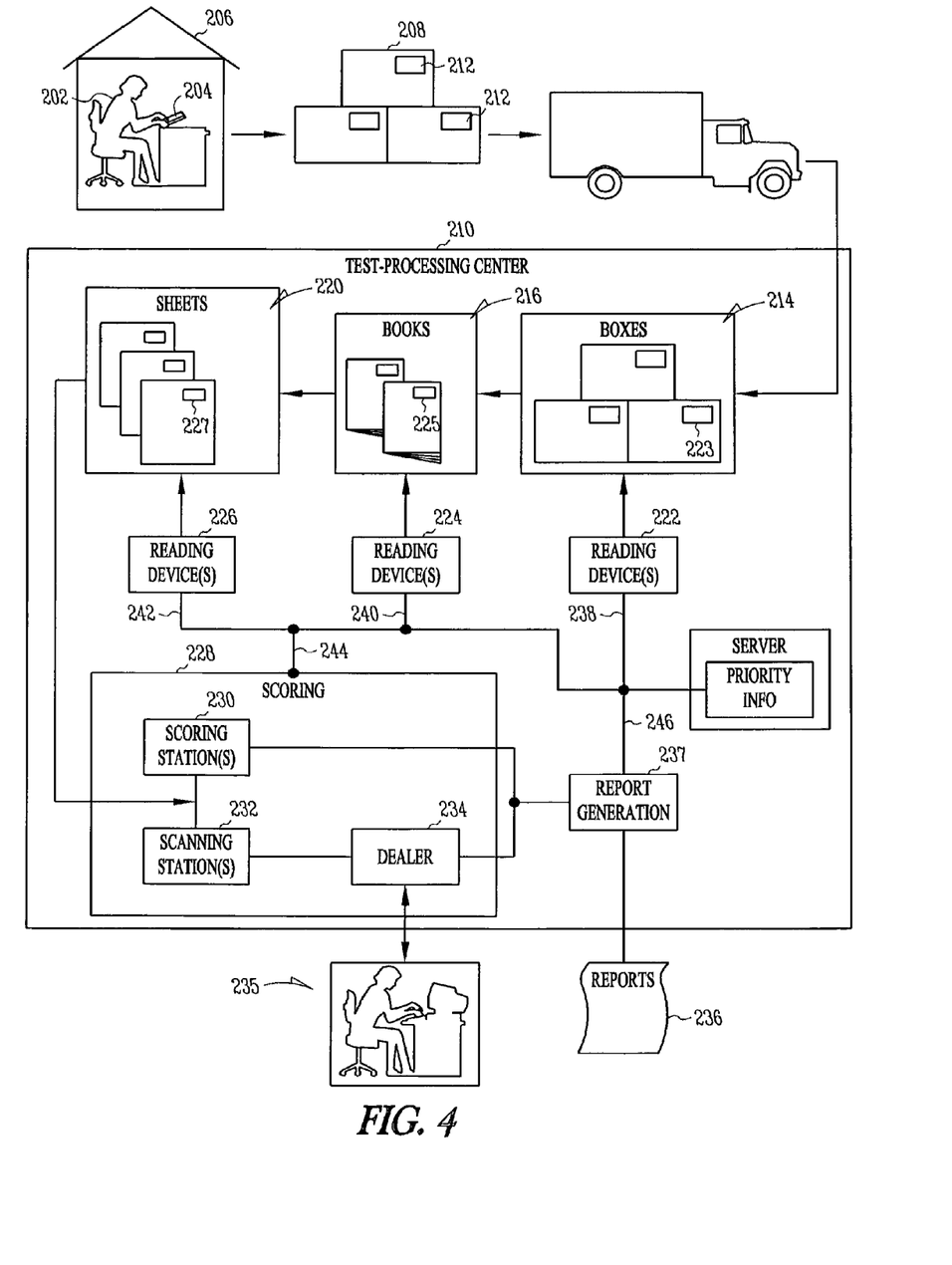
FIG. 4 illustrates a block diagram of an embodiment of an apparatus for processing and scanning documents.

FIG. 4 illustrates a block diagram of an embodiment of an apparatus for processing and scanning documents. The system resides outside the scanning system, and is a setup application used to tell the scanning system how to scan pages of a completed test. In the illustrated embodiment, a test-taker (e.g., a student) 202 completes a standardized test 204 at a test-taking center (e.g., a school) 206. In this embodiment, the standardized tests include test booklets. Each test booklet includes a number of pages that contain a number of test items or questions.

Completed test booklets are boxed, illustrated at 208, for shipping to a test-processing center 210. The boxes include an identifier 212, such as a bar code for example. Upon arriving at the test-processing center 210, the boxes of test booklets are unloaded at 214. The test booklets are removed from the boxes and sorted at 216. At 220, the test booklets are cut into loose pages. These loose pages are reconciled to ensure that all of the pages for each test booklet are accounted for. Reading devices 222, 224, and 226, such as bar code scanners for example, are used to read the identifiers 223 and identify the boxes, read the identifiers 225 and identify the test booklets, and read the identifiers and identify the pages. In one embodiment, the image field definition system identifies the identifying markings for the pages.

The test pages are graded or scored at 228. In one embodiment, objective scoring tasks, such as multiple choice questions for example, are scored using scoring of tests from images 230. In one embodiment, open-ended scoring tasks are scanned at scanning stations 232, are stored in a queue, and are distributed by a dealer 234 to human readers 235 who evaluate the open-ended scoring tasks. Reports 236 of the score results are provided at 237.

A server in the test-processing center is used to perform a variety of tasks with the scanned data, as discussed herein. In one embodiment, the server includes priority information, as illustrated via lines 238, 240, 242, 244 and 246; the priority information is available at various places along the process. In one embodiment, for example, the reading device(s) 222 determines which of the boxes should proceed for further processing before other boxes. In one embodiment, the reading device(s) 224 determine which of the test booklets should proceed for further processing before other test booklets. In one embodiment, the reading device(s) 226 determine which of the pages (or test items on the pages) should proceed for further processing before other pages (or test items on the pages). In one embodiment, for example, the priority information is used in the scoring system 228 to determine which test items should be scored before other test items. In one embodiment, for example, the priority information is used to determine which reports should be provided before other reports 236.

This application is intended to cover adaptations and variations of the present subject matter. It is to be understood that the above description is intended to be illustrative, and not restrictive. The scope of the present subject matter should be determined with reference to the appended claim, along with the full scope of legal equivalents to which the claims are entitled.

I claim:

1. A method, comprising:
    preparing a calibration deck of sheets, including:
        a sheet with a series of reference marks;
        a sheet with objective scoring bubbles that are all filled in with black ink;
        a grey scale bubble sheet having a predetermined number of shades between black and white; and
        a sheet with objective scoring bubbles that are all unfilled, or white;
    scanning the calibration deck of sheets on a scanner;
    comparing results from scanning the calibration deck to an industry standard baseline to create a calibration profile for the scanner; and
    automatically adjusting subsequent images captured on the scanner using the calibration profile.

2. The method of claim 1, wherein comparing results includes determining the amount of skew of an image on a sheet.

3. The method of claim 1, wherein comparing results includes determining the amount of stretch of an image on a sheet.

4. The method of claim 1, wherein comparing results includes measuring track speed of the scanner.

5. The method of claim 1, wherein comparing results includes determining the proportionality of an image on a sheet.

6. The method of claim 1, comprising:
    automatically interpreting results using a threshold value.

7. The method of claim 6, wherein interpreting the results includes proceeding if the results are within a predefined tolerance.

8. The method of claim 7, wherein the interpreting includes providing a notification of unacceptable results so that the scanner can be manually recalibrated.

9. The method of claim 1, comprising:
    providing a status bar showing the relative completion of calibration deck processing.

10. The method of claim 9, wherein the relative completion is measured in percent.

11. The method of claim 1, comprising:
    determining the amount of one or more of shrinkage, stretch, skew or other distortions of a scanned page.

12. A system for calibrating a scanner, comprising:
    a calibration deck of sheets, including:
        a sheet with a series of reference marks;
        a sheet with objective scoring bubbles that are all filled in with black ink;
        a grey scale bubble sheet having a predetermined number of shades between black and white; and
        a sheet with objective scoring bubbles that are all unfilled, or white;
    wherein the calibration deck is adapted to be scanned on the scanner;
    wherein results of scanning the calibration deck are compared to an industry standard baseline to create a calibration profile for the scanner; and
    wherein subsequent images captured on the scanner are automatically adjusted using the calibration profile.

13. The system of claim 12, further comprising:
    a display for depicting results for at least one scanner.

14. The system of claim 13, wherein the display includes a status bar showing the relative completion of calibration deck processing.

15. The system of claim 14, wherein the relative completion is measured in percent.

16. The system of claim 13, wherein the display includes a notification of unacceptable results so that the scanner can be manually recalibrated.

17. The system of claim 12, comprising at least sixteen grey scale bubble sheets having a predetermined number of shades between black and white.

18. The system of claim 12, wherein the grey scale bubble sheet has 256 shades.

19. The system of claim 12, comprising at least 30 sheets with a series of reference marks.

20. The system of claim 12, comprising at least two sheets with objective scoring bubbles that are all filled in with black ink.

21. The system of claim 12, comprising at least two sheets with objective scoring bubbles that are all unfilled, or white.

* * * * *